(12) United States Patent
Garde et al.

(10) Patent No.: US 6,332,188 B1
(45) Date of Patent: Dec. 18, 2001

(54) DIGITAL SIGNAL PROCESSOR WITH BIT FIFO

(75) Inventors: Douglas Garde, Dover; Alexei Zatsman, Newton, both of MA (US); Aryeh Lezerovitz, Ramat Aziz; Zvi Greenfield, Kfar Sava, both of (IL); David R. Levine, Lexington; Jose Fridman, Brookline, both of MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/187,479

(22) Filed: Nov. 6, 1998

(51) Int. Cl.[7] ..................................................... G06F 9/315
(52) U.S. Cl. ............................................. 712/204; 712/35
(58) Field of Search ........................... 712/35, 204; 710/5

(56) References Cited

U.S. PATENT DOCUMENTS

| | | | |
|---|---|---|---|
| 5,539,401 | * | 7/1996 | Kumaki .................................. 341/67 |
| 5,638,524 | * | 6/1997 | Kiuchi .................................. 712/221 |
| 5,644,310 | * | 7/1997 | Laczko ................................... 341/43 |
| 5,765,216 | * | 6/1998 | Weng .................................... 711/214 |
| 5,835,793 | * | 11/1998 | Li ......................................... 712/898 |
| 6,014,095 | * | 1/2000 | Yokoyama ............................. 341/67 |
| 6,026,484 | * | 2/2000 | Golston ................................. 712/226 |
| 6,061,780 | * | 5/2000 | Shippy ................................... 712/204 |

\* cited by examiner

Primary Examiner—Eric Coleman
(74) Attorney, Agent, or Firm—Wolf, Greenfield & Sacks, P.C.

(57) ABSTRACT

A digital signal processor includes a computation block with an arithmetic logic unit, a multiplier, a shifter and a register file. The computation block includes a plurality of registers for storing instructions and operands in a bit format as a continuous bit stream, and utilizes a bit transfer mechanism for transferring in a single cycle a bit field of an arbitrary bit length between the plurality of registers and the shifter. The plurality of registers may be general purpose registers located in the register file. The register file may further include at least one control information register for storing control information used by the bit transfer mechanism.

36 Claims, 6 Drawing Sheets

DIGITAL SIGNAL PROCESSOR WITH BIT FIFO

FIELD OF THE INVENTION

This invention relates to digital signal processors, and more particularly to a digital signal processor with a novel computation block that includes a bit FIFO.

BACKGROUND

A digital signal processor is a special purpose processor optimized for digital signal processing applications such as speech analysis and synthesis to produce computerized speech, image processing, or digital filtering. The digital signal processing applications tend to be intensive in memory access operations and tend to require the input and output of large quantities of data. Real-time digital signal processing requires fast hardware to perform a large number of calculations. In many algorithms, the calculations involve repetitions of a very large number of multiplication and accumulation functions. The number of these calculations, performed in real-time by the processor between individual data samples, may limit the signal processing because it limits the sampling rate. Thus, the processor is designed for high throughput numerical processing and high interrupt rates.

In general, a digital signal processor includes a core processor, at least one memory for storing instructions and operands used in operations, link port buffers for communicating with communication ports and an external port for controlling communications via an external data bus and an external address bus. The core processor includes a control block, an instruction alignment buffer connected to a primary instruction decoder, and at least one computation block for performing the digital signal processing operations. The computation unit includes a register file, a multiplier/accumulator, an arithmetic logic unit (ALU), and a shifter. The core processor may use several different computational schemes and data storage and transfer schemes for optimizing speed, accuracy, size and performance.

Usually, the shifter operates on data organized as n-bit words. The shifter receives instructions from the sequencer, receives operands from the register file, and stores operands in the register file, all operations occurring on n-bit boundaries. For example, the shifter performs a left shift in which the i-th bit is replaced by the (i+1)st bit, and performs a right shift in which the i-th bit is replaced by the (i−1)st bit. In logical shifts, the bit shifted out is lost and the bit shifted in is zero. In circular shifts, the bit shifted out of one end is shifted into the other end, thereby losing no information. In arithmetic shifts, by shifting a bit string left, the shifter multiplies by two the binary number represented by the bit string, and by shifting the bit string right, the shifter divides the binary number by two.

The register file includes a multiplicity of registers having a selected bit size for temporary storage of instructions, operands and results. The register file receives the operands from the memory and provides the operands to the multiplier, the ALU, and the shifter via several operand busses. After computation, the register file receives the results from the multiplier, the ALU, and from the shifter via several result busses. Usually, the multiplier, the ALU and the shifter operate on data that has a fixed word size. However, the fixed word size is not necessarily optimal for all digital signal processing applications.

For example, certain communication applications may use Huffman coding, which uses a variable length character encoding scheme (as opposed to character encoding schemes that use a fixed number of bits per character). The Huffman coding minimizes the total number of bits for characters appearing with the highest frequency. This coding selects the number of bits based on known probabilities so that a data string is decoded as the bits arrive in the data stream. This coding achieves a tighter packing of data since the most commonly occurring characters are short and the infrequently occurring characters are long, wherein the shortest character with the highest probability of occurrence is only one bit long. Most digital signal processors are designed to manipulate data having a fixed word size (e.g., 16-bit or 32-bit words). Such design is not optimal for implementing the Huffman coding.

SUMMARY

The present invention is a digital signal processor with a novel computation block and a method for transferring in a single cycle a bit field of an arbitrary bit length (or words of a variable bit length), wherein the transferred bit field is used for further operations.

A digital signal processor includes a computation block with an arithmetic logic unit, a multiplier, a shifter and a register file. The computation block also includes a plurality of registers for storing instructions and operands in a bit format as a continuous bit stream, and uses a bit transfer mechanism constructed and arranged to transfer in a single cycle a bit field of an arbitrary bit length between the plurality of registers and the shifter.

In one embodiment, the plurality of registers are general purpose registers located in the register file. The register file may further include at least one control information register arranged to store control information used by the bit transfer mechanism.

Preferably, the bit transfer mechanism is further arranged to extract a bit field of a length, specified according to the control information, from a continuous bit stream held in the plurality of registers and store the extracted bit field in the shifter.

Preferably, the register file further includes a pointer register arranged to store a bit pointer, and a length register arranged to store a bit length. The bit transfer mechanism may be further arranged to extract the bit field, having the bit length specified in the length register and being at a location specified by the bit pointer, from the plurality of registers and store the extracted bit field in the shifter. The bit pointer may be arranged to keep track of a current bit position in the continuous bit stream stored in the plurality of registers. The arithmetic logic unit may be arranged to update the bit pointer by the specified length.

Preferably, the arithmetic logic unit updates the bit pointer by the specified length by adding to the bit pointer the specified length and returning to the pointer register modulo of a number that is equal to one half of a capacity of the plurality of registers. The digital signal processor may include a memory and the bit transfer mechanism may be further arranged to conditionally load data from the memory to the plurality of registers. The bit transfer mechanism may be arranged to make the conditional loading permanent when the updated pointer is incremented past a selected bit capacity of the registers. The selected bit capacity may be 64 bits In another embodiment, the register file includes a pointer register arranged to store a bit pointer, and a length register arranged to store a bit length. The bit transfer mechanism may be further arranged to deposit from the shifter to the plurality of registers a bit field having a bit length specified in the length register and being stored at a location specified by the bit pointer. The bit pointer may be arranged to keep track of a current bit position in the continuous bit stream stored in the general purpose registers. The arithmetic logic unit may be arranged to update the pointer register by the length. The arithmetic logic unit may update the pointer register by the specified length by adding to the bit pointer the specified length and returning to the pointer register modulo 64 of the addition. Alternatively, the arithmetic logic unit may return to the pointer register a number equal to modulo 32 of the addition when the bit capacity of the registers is 32 bits.

Preferably, the bit transfer mechanism may be arranged to conditionally load data from the plurality of registers to a memory of the digital signal processor. The bit transfer mechanism can make the conditional loading permanent when the updated pointer points at a bit number smaller than a bit number of the pointer prior to the updating.

These digital signal processors have computation blocks with bit-oriented designs that can efficiently manipulate operands and instructions of variable bit lengths. The computation blocks can extract and deposit words across word boundaries or realign groups of words. For example, the digital signal processors handle efficiently data that have an arbitrary word length, which may be other than the commonly used 16-bit or 32-bit formats, using 32-bit registers. Advantageously, the processor does not need to store, for example, a 18-bit word in a 32-bit register by extending the 18-bit word to 32-bits and wasting 14 bits of storage, as is frequently done by a standard processor. In addition to the ability of transferring bit fields of arbitrary length, the invention allows efficient packing and unpacking of bit fields used, for example, in the Huffman coding.

DESCRIPTION OF PREFERRED EMBODIMENTS

In general, a digital signal processor (DSP) includes a core processor that performs the main computation and data processing functions. As specifically described below, the core processor includes at least one computation block with a novel design. The computation block includes several computation units that can store a continuous bit stream of data (i.e., instructions or operands) in a bit format in a plurality of registers. The computation block can manipulate, in a single cycle, a bit field of an arbitrary bit length by extracting the bit field from, or depositing the bit field into, the continuous bit stream. This manipulation is performed regardless of the word boundaries of data provided to, or processed by, the processor.

Figure 1:
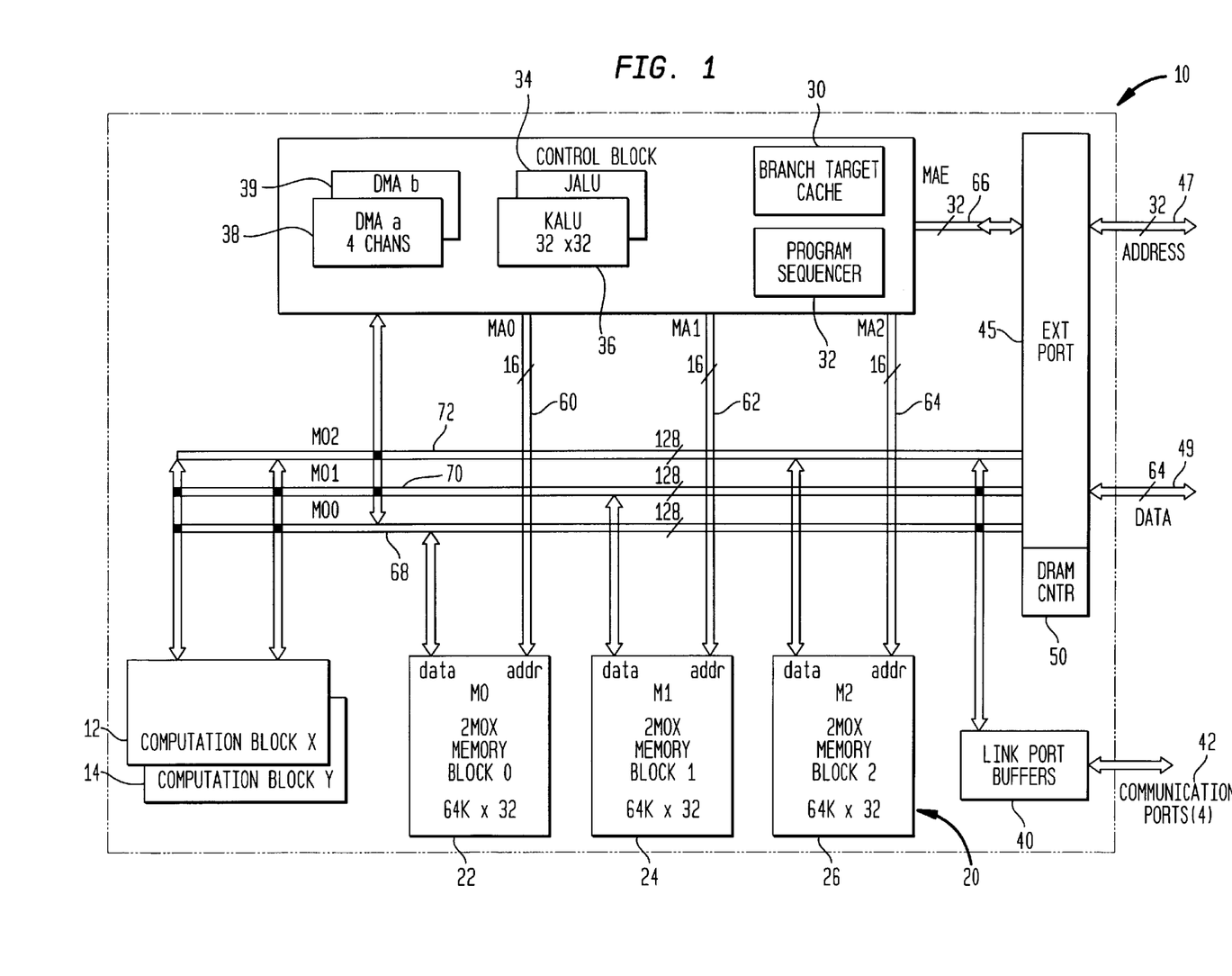
FIG. 1 is a block diagram of a digital signal processor.

Referring to FIG. 1, the DSP 10 includes computation blocks 12 and 14, a memory 20, a control block 30, link port buffers 40, an external port 45 and a D-RAM controller 50. The DSP 10 includes a set of computation blocks 12, 14, a memory 20, a control block 30, link port buffers 40, an external port 45 and a D-RAM controller 50. The DSP 10 also includes an instruction alignment buffer and a primary instruction decoder (not shown in FIG. 1). The computation blocks, the instruction alignment buffer, the primary instruction decoder, and the control block constitute the core processor that performs the main computation and data processing functions. Memory 20 includes, for example, three independent 2 Mbit memory banks 22, 24 and 26 (shown as memory blocks 0, 1 and 2). Each memory bank has a capacity of 64K words that are 32 bits long. Each memory bank is connected to a 128-bit wide data bus and to a 16-bit wide address bus. Up to four consecutively aligned data words having 32 bits each can be transferred to and from each memory bank in a single clock cycle.

Control block 30 includes a program sequencer 32, a first integer ALU 34 (J ALU), a second integer ALU 36 (K ALU), a first DMA address generator 38, and a second DMA address generator 39. In general, ALU 34 and ALU 36 execute integer ALU instructions, perform data address generation and supply a data address on an address buses to the memory. Program sequencer 32 supplies instruction addresses on the address bus and provides the accessed instructions to an instruction alignment buffer (not shown).

The DSP 10 includes several address buses for supplying addresses and data buses for supplying data. A first address bus 60 (MA0) interconnects memory bank 22 (M0) and control block 30. A second address bus 62 (MA1), and a third address bus 64 (MA2) interconnect memory banks 24 (M1), 26 (M2) with control block 30, respectively. Each of the address buses is preferably 16-bit wide and includes multiple lines for parallel transfer of binary information. A 32-bit wide external address bus 66 (MAE) interconnects control block 30 with external port 45. External port 45 is connected to an external address bus 47, which is preferably 32 bits wide.

The DSP 10 includes, for example, three 128-bit wide data buses. A first data bus 68 (MD0) interconnects computation blocks 12 and 14, memory bank 22, control block 30, link port buffers 40, the instruction alignment buffer (not shown) and external port 45. Similarly, a second data bus 70 (MD 1) and a third data bus 72 (MD2) interconnect computation blocks 12 and 14, respective memory banks 24 and 26, control block 30, link port buffers 40, the instruction alignment buffer (not shown) and external port 45. External port 45 is connected to an external data bus 49, which is preferably 64 bits wide. Thus, the DSP 10 can communicate with a host or an external memory using external port 45, data buses 68, 70 and 72, and address bus 66. The DSP 10 can also communicate using several serial ports (not shown) and one or more link ports 42 connected to link port buffers 40; this is described in detail, for example, in U.S. Pat. No. 5,619,720.

The DSP 10 is designed for optimal data processing. "Data" refers to binary words, which may represent either instructions or operands that are associated with the operation of the DSP 10. Since each of the memory banks 40, 42 and 44 has a separate bus, they may be accessed simultaneously. In a typical operating mode, program instructions are stored in one of the memory banks, and operands are stored in the other two memory banks. Thus, at least one instruction and two operands can be provided to computation blocks 12 and 14 in a single clock cycle. Each of the memory banks 22, 24, and 26 is configured to permit reading and writing of multiple data words in a single clock cycle. The simultaneous transfer of multiple data words from each memory bank to computation block 12 or 14 in a single clock cycle is accomplished without requiring an instruction cache or a data cache.

The control block 30 includes integer ALUs 34 and 36, which at different times, execute integer ALU instructions and perform data address generation. During execution of a program, program sequencer 32 supplies a sequence of instruction addresses on one of the address buses (60, 62 or 64) depending on the location of the instruction sequence. Typically, one of the memory banks (22, 24 or 26) is used for storage of the instruction sequence. In addition, each of the integer ALUs (34 and 36) supplies a data address on one of the address buses (60, 62 or 64), depending on the location of the operand required by the instruction. For example, if an instruction sequence is stored in memory bank 22 and the operands are stored in memory banks 24 and 26, program sequencer 32 supplies instruction addresses on address bus 60 and provides the accessed instructions to the instruction alignment buffer (not shown).

Integer ALUs 34 and 36 may output addresses of operands on address buses 62 and 64, respectively. In response to the addresses generated by integer ALUs 34 and 36, memory banks 24 and 26 supply operands on data buses 70 and 72, respectively, to either one or both computation blocks 12 and 14. Memory banks 22, 24 and 26 are interchangeable with respect to storage of instructions and operands. The processor has a pipelined architecture that permits fast access to memory 20 and enables the units of the DSP 10 to operate twice as fast as a non-pipelined architecture.

Figure 2:
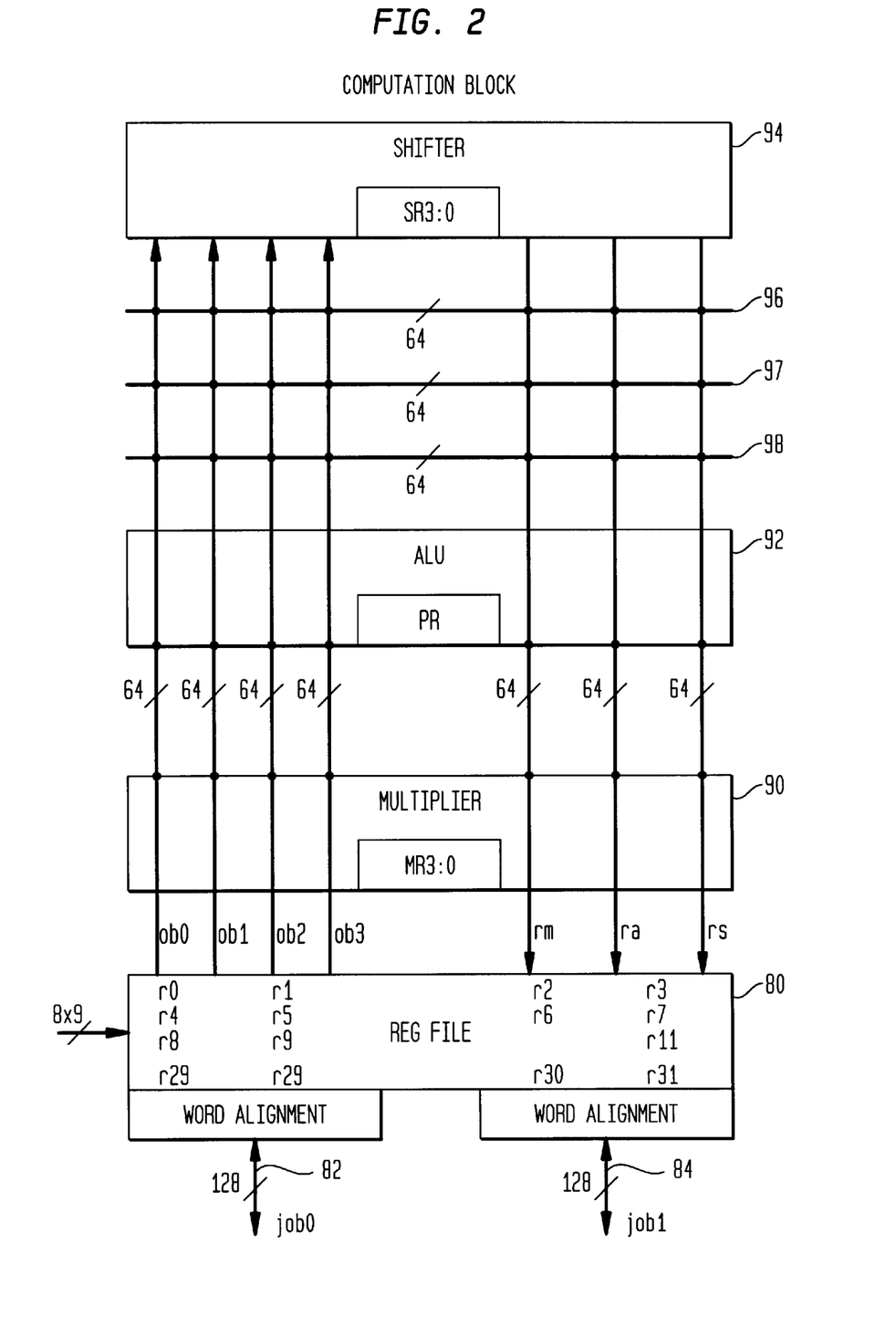
FIG. 2 is a block diagram of one of two computation blocks shown in FIG. 1.

Referring to FIG. 2, each computation block 12 or 14 includes a register file 80, a multiplier/accumulator 90, an arithmetic logic unit (ALU) 92 and a shifter 94. Register file 80 includes multiple ports and provides temporary storage for operands and results. In a preferred embodiment, register file 80 has a capacity of 32 words having 32 bits each, organized as 8 rows of 128 bits each. Register file 80 is in a standard way connected through a multiplexer and latch (not shown) to each of data buses 68, 70 and 72 (shown in FIG. 1). As described above, when operands are fetched from memory 20, two of the three data buses provide the operands to register file 80 via a bus 82 (iob0) and a bus 84 (iob1), each of which is 128 bits wide. (In another embodiment, the register file may have a different capacity and the buses may have different widths, all of which are within the scope of the present invention) As known in the art, when writing data from register file 80 to memory 20 (or to an external memory), the data are supplied to the multiplexer and latch (not shown) that is connected to buses 82 and 84 and to data buses 68, 70 and 72 (shown in FIG. 1). The multiplexer and latch selects data buses 68, 70 and 72 for writing to the memory, and permits word selection within each bus under instruction control. The multiplexer and latch is controlled by a secondary instruction decoder (not shown). The secondary instruction decoder is used to address register file 80 and provide control signals for the multiplexer and latch, multiplier/accumulator 90, ALU 92 or shifter 94. Each computation block 12 or 14 may execute up to three instructions in the same clock cycle, wherein these instructions are performed by multiplier/accumulator 90, ALU is 92 or shifter 94.

For single word transfers, the multiplexer and latch may or may not select the accessed data word. For dual word transfers, the multiplexer and latch select either or both data words. For quad word transfers, the multiplexer and latch select different combinations of dual data words or select the entire quad data word. The single, dual, or quad data words can be transferred to computation block 12, to computation block 14, or to both in a single clock cycle. The ability to access multiple instructions in each clock cycle allows multiple operations to be executed in each cycle, thereby improving the processor performance. If operands can be supplied faster than they are needed by computation blocks 12 and 14, then there are memory cycles left over, and these memory cycles can be used by the DMA address generators 38 and 39 to provide new data to memory banks 22, 24 and 26, without stealing the cycles from the core processor. Finally, the ability to access multiple data words makes it possible to utilize two or more computation blocks and to keep them supplied with operands.

Referring again to FIG. 2, multiplier/accumulator 90, ALU 92 and shifter 94 can simultaneously execute instructions to the extent that sufficient instructions and operands are supplied to the computation block. Four 64-bit wide operand buses (ob0), (ob1), (ob2) and (ob3) supply operands from the register file 80 to multiplier/accumulator 90, ALU 92 and shifter 94. Three 64-bit wide result buses rm, ra and rs are also connected to multiplier/accumulator 90, ALU 92 and shifter 94 for returning results to register file 80. Furthermore, the result buses are connected to each of the computation units so that each computation unit can obtain operands directly. The primary instruction decoder provides instructions to the secondary instruction decoder (not shown) that decodes these instructions.

As shown in FIG. 2, bypass buses 96, 97 and 98 connect the operand buses to the result buses. Bypass buses 96, 97 and 98 are designed to increase the computation rate. Operands from register file 80 or from the memory access are available for the computation units as described above. Furthermore, bypass buses 96, 97 and 98 provide operands from one computation unit to another directly without first writing the operands first to register file 80 and then providing it from register file 80 to the intended computation unit.

Figure 3:
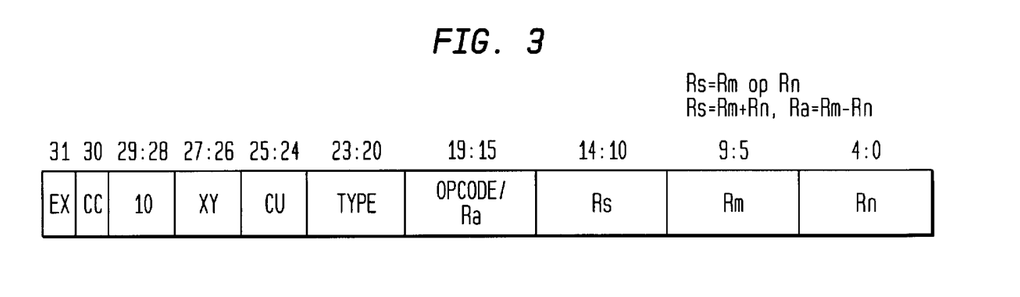
FIG. 3 shows the instruction format used by the computation blocks.

FIG. 3 shows the instruction format used in computation blocks 12 or 14. The instruction is 32 bits long (alternatively, 64 bits long or other) and has the following fields: EX, CC, 10, XY, CU, TYPE, Opcode/Ra, Rs, Rm and Rn. The EX bit specifies whether the processor executes one or several instructions in a cycle. When the EX bit is equal to logic 1, the instruction is the last instruction in a line. When the EX bit is equal to logic 0, the instruction is followed by additional instructions in the same line. The CC bit identifies conditional instructions. When the CC bit equals logic 1, the entire instruction line is conditional, and executes only when the condition that has been established earlier by another instruction evaluates true. The XY field specifies whether the instruction is executed in computation block X (i.e., block 12 in FIG. 1), in computation block Y (i.e., block 14 in FIG. 1) or in both. When field XY equals 01, computation block X executes the instruction. When field XY equals 10, computation block Y executes the instruction, and when field XY equals 11, both computation blocks execute the instruction. The CU field specifies the particular computation unit (i.e., the ALU, the multiplier, or the shifter) that performs the instruction. The combined TYPE and Opcode/Ra fields specify the operation to be performed by computation blocks 12 and 14. The Rm and Rn fields provide a register address to the operands, and the Rs field provides the designation register address, as described below.

Figure 4:
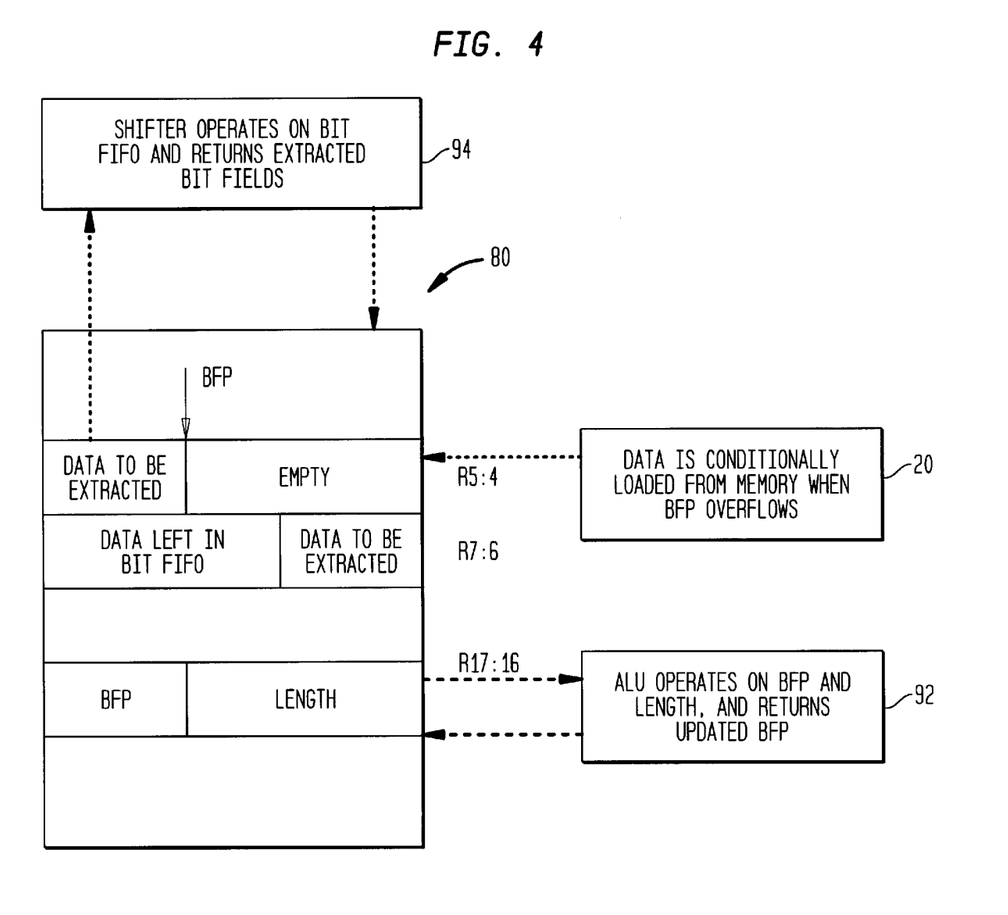
FIG. 4 is a block diagram of the computation block showing a register file used by a continuous bit FIFO.
Figure 4A:
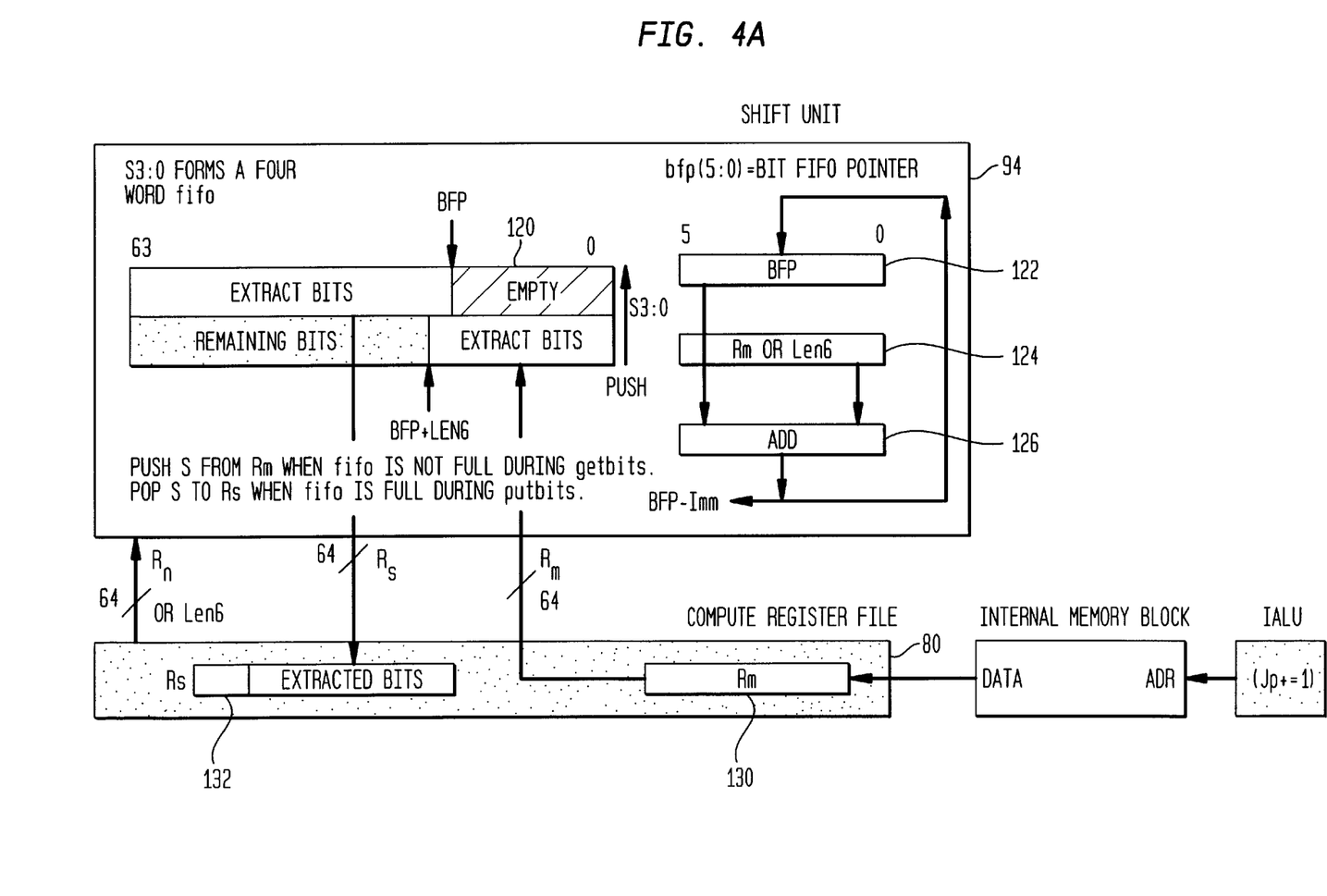
FIG. 4A is a block diagram of an alternative embodiment of the continuous bit FIFO.

A continuous bit FIFO extracts and deposits words of a variable bit length by using a set of general purpose registers located in register file 80, as described in the embodiment of FIG. 4, or by using a set of designated FIFO registers, as described in the embodiment of FIG. 4A.

Referring to FIG. 4, in a presently preferred embodiment, register file 80 includes four general purpose registers (R4, R5, R6 and R7) for storing instructions and operands as a continuous bit stream, and two registers (R16 and R17) for storing control information. As described below, these registers are arranged to facilitate the continuous bit FIFO, in which the extracted or deposited bit fields may cross word boundaries. Registers R4 through R7 store the continuous bit stream as it is deposited to or extracted from register file 80. Registers R16 and R17 store a bit FIFO pointer (BFP) and a length value, respectively. The continuous bit FIFO uses three instructions: GETBITS, PUTBITS and BFOINC. The GETBITS and PUTBITS instructions are shifter instructions for extracting input data from register file 80 and returning the results of shifter operations into register file 80, respectively. The BFOINC instruction is an ALU instruction that instructs ALU 92 to increment the BFP into the bit FIFO, as described with reference to FIG. 7.

Figure 5:
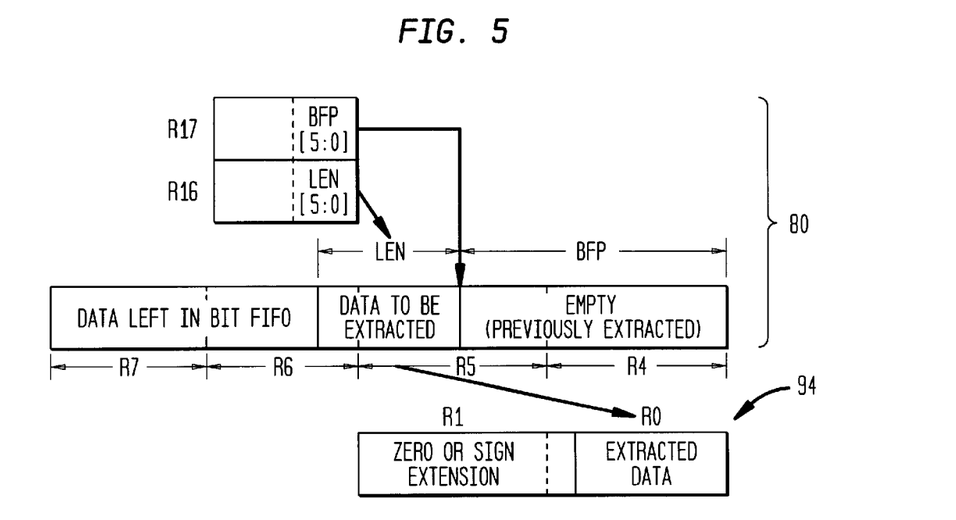
FIG. 5 shows data flow between registers when executing a GETBITS instruction.

FIG. 5 shows the individual registers used during the execution of the GETBITS instruction. When executing the GETBITS instruction, shifter 94 extracts a bit field of an arbitrary length stored in registers R4, R5, R6 and R7 located in register file 80 and deposits the extracted bit field to register R0 located in shifter 94. Shifter 94 then operates on the bits located in register R0. The length (len) of the extracted bit field is provided in register R16 and the BFP in register R17. The GETBITS instruction has the following format:

Rsd=GETBITS Rnq BY Rmd (SE)

In the instruction above, Rsd is the designated shifter register, Rnq specifies the general purpose registers that include the continuous bit stream, and Rmd specifies the control information registers that includes the length and the current BFP. In the above instruction format, registers with operands are denoted by the letter "R" followed by a lower-case letter "s, m or n" that distinguishes the three registers. Usually, "s" denotes the result, and "n" and "m" denote the source operands. The third letter specifies whether the register is a quad register (e.g., Rnq is used for registers R7:4), or a double register (e.g., Rind is used for registers R17:16). The absence of the third letter denotes a single register (e.g., Rn for register R5). SE is the sign extension, as known in the art.

As shown in FIG. 5, upon execution of the GETBITS instruction, the BFP advances to the left by the value of the length, or wraps when extending past bit 63, as described below in connection with the BFOINC instruction. If the SE option is set, the bits to the left of the deposited field in the destination register pair (Rsd) are set equal to the most significant bit of the deposited field; otherwise, the original bits in registers Rsd are unaffected. In order to maintain a constant flow of data into the bit FIFO, data from memory banks 22, 24 or 26 (FIG. 1) are conditionally loaded into registers R5:4. When the updated BFP is not larger than 63, no data is loaded. When the updated BFP is larger than 63, the conditionally loaded data is made permanent. The GETBITS instruction may be executed by the following assembly code sequence:

```
XR1:0         hold extracted bit field
XR17:         holds control information
XR1:0 = GETBITS R7:4 BY R17:16;;   /*extract field*/
XR17 = BFOINC R17:16;;             /*advance BFP*/
    /*When BFP>63, move upper FIFO word into lower word,
       nd load next quad word: */
if ALT; do XR5:4 = XR7:6; do XR7:6 = L[j0+=2];;
```

In the above code sequence, "XR" refers to a register in computation block X (i.e., computation block 12 in FIG. 1). In the last conditional instruction, when ALT is less than zero both instructions are executed, wherein "L[j0+=2]" loads data from memory into register pair R7:6.

Figure 6:
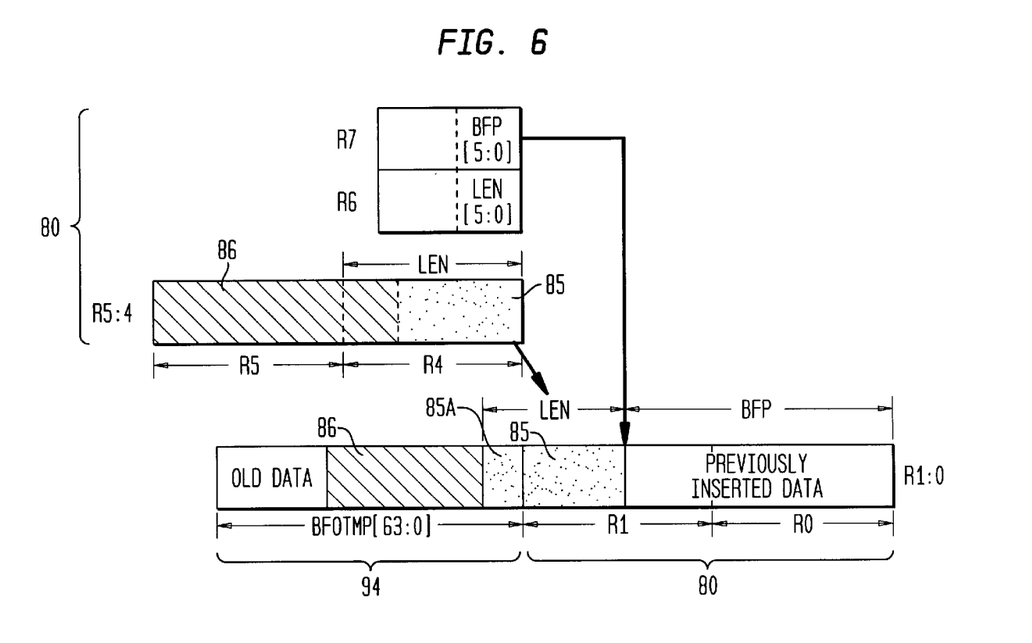
FIG. 6 shows data flow between registers when executing a PUTBITS instruction.

Referring to FIGS. 4 and 6, after performing one or several shifter operations, shifter 94 can execute the PUTBITS instruction. When executing the PUTBITS instruction, shifter 94 deposits a bit field of a length specified in register R6 (len) from registers R5:4 to registers R1:0, all of which are located in register file 80. The deposited bit field is placed right-justified at the location specified by the BFP, which is stored in register R7. The PUTBITS instruction has the following format:

Rsd+=PUTBITS Rnd BY Rmd wherein Rsd specifies the general purpose registers where the bit field is deposited, Rnq specifies the shifter register with the bit field, and Rmd specifies registers with the control information, i.e., the current BFP.

When shifter 94 executes the PUTBITS instruction, the entire contents of register pair Rnd is placed in the quad registers formed by Rsd and BFOTMP. The BFOTMP register is an internal register to shifter 94 and is used for temporary storage of the overflow bits when executing the PUTBITS instruction. The inserted data is placed starting at the bit pointed by the BFP located field in the register pair Rmd. Usually, the inserted bit field is less than 64 bits. The field of interest is placed right-justified in register Rnd, wherein the remaining bits to the left of the field of interest are irrelevant, and later overwritten. (For illustration, register pair Rnd is shown in FIG. 6 as registers R5:4 containing bit fields 85 and 86. Bit field 85 has has the length "Len". Bit fields 85 and 86 are placed in registers R0, R1, and BFOTMP right-justified. Since bit field 85 is longer than the available space in registers R1:0, bit filed 85A overflows and is temporarily stored in the BFOTMP register.)

ALU 92 updates the BFP, as will be described below, and when the BFP overflows past bit 63, it sets a flag "AN". When the BFP overflows past bit 63, the contents of Rsd is moved out of register file 80 into the memory, and the contents of the BFOTMP register is moved into Rsd. The bit FIFO insertion may be implemented by the following assembly code sequence:

```
XR5:4 hold field to be inserted
XR7:6        hold control information
XR1:0 = PUTBITS R5:4 BY R7:6;;     /* insert field */
XR7   = BFOINC R7:6;;              /* advance BFP */
if ALT, do L[j0+=2] = XR1:0;;   /* when BFP>63, store assembled fleld to mem */
if ALT, do XR1:0 = BFOTMP;;     /* when BFP>63, move BFOTMP to XR1:0 */
```

Figure 7:
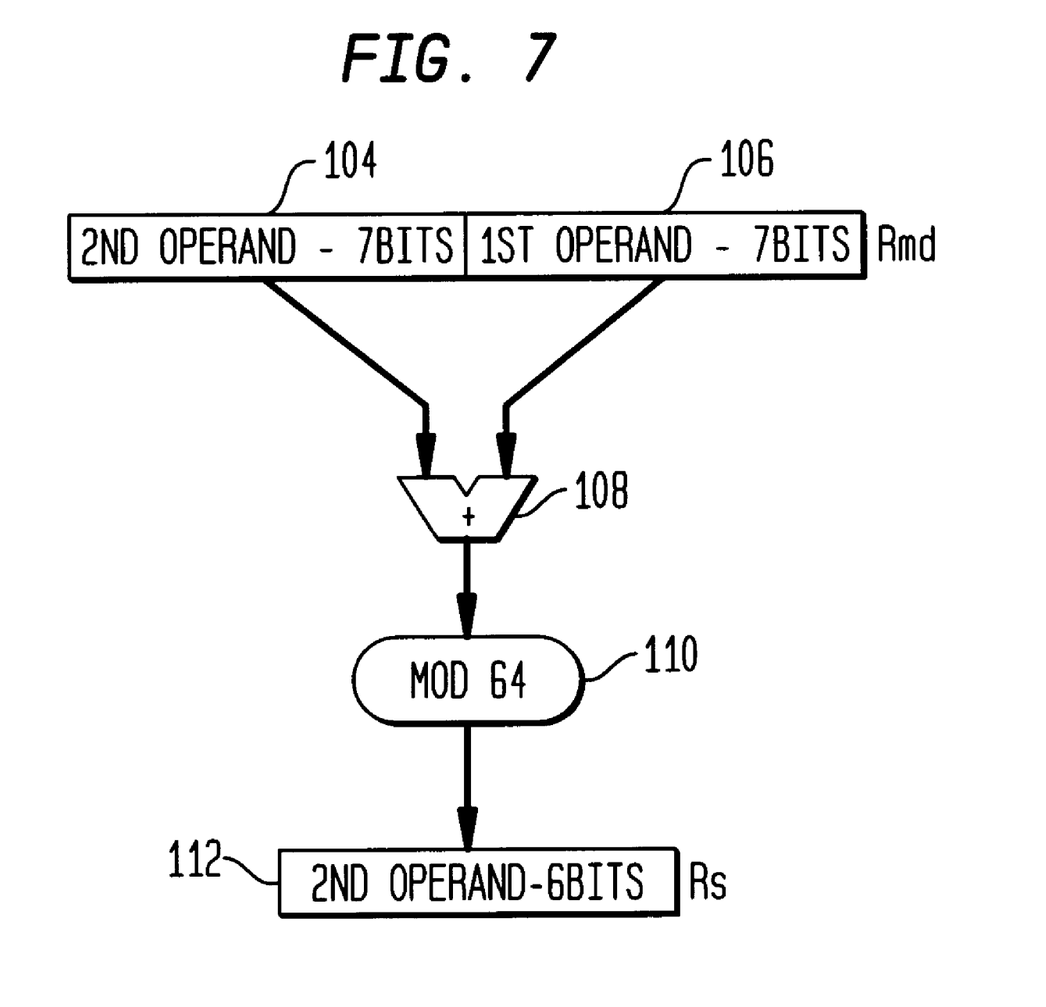
FIG. 7 shows data flow when executing a BFOINC instruction.

Referring to FIGS. 4 and 7, the BFOINC instruction updates the BFP after executing the GETBITS and PUTBITS instructions. In step 108, the ALU 92 adds the seven least significant bits of each of the two operands in registers 104 and 106, divides the result by 64 (modulo operation 110) and returns the remainder to the six least significant bits of the second operand. The result is placed in a register 112 and the AN status flag is set when the addition passes bit 63. The BFOINC instruction has the following format:

Rs=BFOINC Rmd wherein registers Rmd (104 and 106) hold the length and BFP values, and register Rs (112) receives the result.

Specifically, when executing the BFOINC instruction as a part of the GETBITS instruction, ALU 92 receives operands from register R17, which holds the BFP and from register R16, which holds the length, and provides the BFP value back to register R17.

Referring to FIG. 4A, in another embodiment, shifter 94 includes four designated compute registers (S3:0) 120, and includes registers 122, 124 and 126 for storing the control information. Register 122 stores the BFP value, a register 124 stores the length value, and a register 126 stores the undated BFP value after shifter 94 executes the GETBITS or PUTBITS instruction. Register file 80 includes a register 130 for storing the Rm value and a register 132 for storing the bits extracted from registers S3:0. The S3:0 registers are used for storing the continuous bit stream. The conditional loading occurs between the memory and register file 80, in a manner similar to that shown in FIG. 4. When executing the GETBITS instruction, the transferred bit field is loaded from register 130 and is automatically stored into register 120, and when executing the PUTBITS instruction, the transferred bit field is automatically stored in register 130.

The primary difference between the embodiment of FIG. 4A and the embodiment of FIG. 4 is in the way the BFP is updated. In the embodiment shown in FIG. 4, the BFP is updated by ALU 92, while in the embodiment shown in FIG. 4A, the BFP is updated by shifter 94. The updating of the BFP in the shifter is specified by the instructions GETBITS and PUTBITS themselves, rather than by the separate ALU instruction (FIG. 4). However, in both cases, the value of the BFP (register 122) is added to the bit field length (register 124) and then the result is divided by 64 in the modulo operation. When the result of the modulo operation overflows 64, the shifter automatically loads data and stores them in the appropriate registers, as shown in FIG. 4A.

After extracting the bit fields from the packed stream (i.e., the GETBITS instruction), the extracted bits are used for a variety of operations. In the Huffman decoding, each bit field is mapped to an information symbol. After a bit field with n<32 bits is extracted, this field is placed into a 32-bit register, but only the n least significant bits in this register are useful coding information. This register is then used as a pointer to a table that holds the information symbols. The reverse sequence of operations is used to generate fields to be inserted into a packed stream (using the PUTBITS instruction). Here, an information symbol is translated into a 32-bit word using a look-up table. The 32-bit word has only n valid information bits and is used as an input to in the PUTBITS instruction, which packs only the n valid information bits into an output stream.

The above-described digital signal processors are used to process data formats encountered in high definition television (HDTV), where data written in other than the 16-bit or 32-bit formats. Alternatively, the processors are also used in wireless telecommunication systems, switching systems and networking systems, including remote access servers, that connect computer networks and computing devices. The processors are also used in graphics systems for radar or medical imaging or in other applications that use data written in other than the 16-bit or 32-bit formats. Advantageously, the processors do not need to store, for example, a 18-bit word in a 32-bit register by extending the 18-bit word to 32-bits and wasting 14 bits of storage, as is frequently done by standard processors.

Having thus described illustrative embodiments of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

We claim:

1. A method for transferring a bit field of a specified length from a continuous bit stream, comprising steps of:

providing a computation block including an arithmetic logic unit, a multiplier, a shifter, and a register file;

providing a continuous bit stream of operands stored in a bit format in a plurality of registers; and causing, in a single cycle, a transfer of a bit field of an arbitrary bit length between said plurality of registers and said shifter;

wherein each operand may span across more than one of the plurality of registers.

2. The method of claim 1 wherein the step of providing said continuous bit stream includes storing said continuous bit stream of instructions or operands in general purpose registers located in said register file.

3. The method of claim 2 wherein the step of causing said transfer includes keeping track of a current bit position in said plurality of registers by a bit pointer stored in a pointer register located in said register file.

4. The method of claim 2 wherein the step of causing said transfer includes extracting said bit field from a designated location of said general purpose registers according to a control information and storing said extracted bit field in said shifter.

5. The method of claim 3 wherein the step of causing said transfer includes:

extracting said bit field having said bit length specified in a length register located in said register file and being at a location in said general purpose registers designated by said bit pointer, and storing said extracted bit field in said shifter.

6. The method of claim 5 wherein said extracting includes updating said pointer register by said specified length.

7. The method of claim 6 wherein said updating includes adding to said bit pointer said specified length in said arithmetic logic unit and returning to said pointer register said bit pointer having a value being modulo 64 of said addition.

8. The method of claim 7 further including conditionally loading data from a memory of a digital signal processor to said plurality of registers.

9. The method of claim 8 wherein data is loaded from the memory to the plurality of registers only when the bit pointer has a value greater than 63.

10. The method of claim 1 wherein the step of causing said transfer includes depositing said bit field from said shifter into said plurality of registers at a designated location according to a control information, said plurality of registers being general purpose registers located in said register file.

11. The method of claim 1 wherein said plurality of registers are general purpose registers located in said register file and the step of causing said transfer includes depositing said bit field from said shifter into said plurality of registers and storing said deposited bit field in said plurality of registers, said bit field having said bit length specified by a length register located in said register file and being stored at a location of a bit pointer located in said register file.

12. The method of claim 11 wherein said depositing includes updating said pointer register by said specified length.

13. The method of claim 12 wherein said updating includes adding to said pointer said specified length in said arithmetic logic unit and returning to said pointer register said bit pointer of a value mod 64.

14. The method of claim 13 further including conditionally loading data into a memory of said digital signal processor from said plurality of registers.

15. The method of claim 14 wherein data is loaded from the plurality of registers to the memory only when said updated bit pointer is smaller than 63.

16. A computation block used in a digital signal processor, comprising:
an arithmetic logic unit, a multiplier, a shifter, and a register file;
a plurality of registers arranged to store operands in a bit format as a continuous bit stream; and
a bit transfer mechanism constructed and arranged to transfer, in a single cycle, a bit field of an arbitrary bit length between said plurality of registers and said shifter;
wherein each operand may span across more than one of the plurality of registers.

17. The computation block of claim 16 wherein said plurality of registers are general purpose registers located in said register file.

18. The computation block of claim 17 wherein said register file further includes at least one control information register arranged to store control information used by said bit transfer mechanism, said bit transfer mechanism being further arranged to extract a bit field of a length, specified according to said control information, from a continuous bit stream held in said plurality of registers, and store said extracted bit field in said shifter.

19. The computation block of claim 17 wherein
said register file further includes a pointer register arranged to store a bit pointer, and a length register arranged to store a bit length; and
said bit transfer mechanism being further arranged to extract said bit field, having said bit length specified in said length register and being at a location specified by said bit pointer, from said plurality of registers and store said extracted bit field in said shifter.

20. The computation block of claim 19 wherein said bit pointer is arranged to keep track of a current bit position in said continuous bit stream stored in said plurality of registers.

21. The computation block of claim 20 wherein said arithmetic logic unit is arranged to update said bit pointer by said bit length specified in said length register.

22. The computation block of claim 21 wherein said arithmetic logic unit updates said bit pointer by said specified length by adding to said bit pointer said specified length and returning to said pointer register modulo of a number that is equal to one half of a capacity of said plurality of registers.

23. The computation block of claim 22 wherein said digital signal processor includes a memory, said bit transfer mechanism being further arranged to conditionally load data from said memory to said plurality of registers.

24. The computation block of claim 23 wherein said bit transfer mechanism is arranged such that data is loaded from the memory to the plurality of registers only when said updated pointer is incremented past a selected bit capacity of said registers.

25. The computation block of claim 17 wherein
said register file further includes a pointer register arranged to store a bit pointer, and a length register arranged to store a bit length; and
said bit transfer mechanism is further arranged to deposit a bit field from said shifter to said plurality of registers at a location specified by said pointer.

26. The computation block of claim 25 wherein said bit pointer is arranged to keep track of a current bit position in said continuous bit stream stored in said general purpose registers.

27. The computation block of claim 26 wherein said arithmetic logic unit is arranged to update said pointer register by said bit length.

28. The computation block of claim 27 wherein said arithmetic logic unit is arranged to update said pointer register by said specified length by adding to said bit pointer said bit length and returning to said pointer register modulo 64 of said addition.

29. The computation block of claim 28 wherein said digital signal processor includes a memory, and said bit transfer mechanism is arranged to conditionally load data from said plurality of registers to said memory.

30. The computation block of claim 29 wherein said bit transfer mechanism is arranged such that data is loaded from the plurality of registers to the memory only when said updated pointer points at a bit number smaller than a bit number of said pointer prior to said updating by said bit length.

31. A digital signal processor, comprising:
a computation block including an arithmetic logic unit, a multiplier, a shifter, and a register file;
a plurality of registers for storing operands in a bit format as a continuous bit stream; and
means for transferring in a single cycle a bit field of an arbitrary bit length between said plurality of registers and said shifter;
wherein each operand may span across more than one of the plurality of registers.

32. The digital signal processor of claim 31 wherein said register file includes control information register means for storing control information used by said transferring means, and wherein said plurality of registers are general purpose registers located in said register file.

33. The digital signal processor of claim 32 wherein said bit transferring means further include means for extracting said bit field of a length, specified according to said control information, from said continuous bit stream held in said plurality of registers and means for storing said extracted bit field in said shifter.

34. The digital signal processor of claim 33 wherein said extracting means are arranged to extract said bit field at a designated location according to a control information.

35. The digital signal processor of claim 31 wherein said bit transferring means further include means for depositing said bit field into said plurality of registers located in said register file, said bit field having said bit length specified by a length register located in said register file and said bit field being deposited at a location of said bit pointer.

36. The digital signal processor of claim 32 wherein said bit transferring means further include means for depositing said bit field from said shifter into said plurality of registers at a designated location according to a control information.

* * * * *